UNITED STATES PATENT OFFICE 2,486,720

ADHESION OF RUBBER TO FIBROUS MATERIALS

Fred S. Perkerson, La Grange, Ga., assignor, by mesne assignments, to Callaway Mills Company, La Grange, Ga., a corporation of Georgia No Drawing. Application December 22, 1945, Serial No. 636,799

6 Claims. (Cl. 154—139)

This invention relates to improvements in the bonding of rubber with fibrous materials and includes an improved method and improved composite vulcanized products.

More particularly, the invention relates to improvements in the bonding of rubber compositions to cotton and rayon fabrics used in tire carcasses and tire manufacture where adhesion of the vulcanized rubber composition and the tire fabric is important and with resulting improvement in the resulting cotton-rubber or rayon-rubber bond and increased serviceability of the tires.

According to the present invention, the fibrous materials, such as cotton or rayon fabrics or cords used in tire construction, are subjected to esterification of the fibers with alpha-beta unsaturated carboxylic acids or their anhydrides, halides, etc., prior to the application of the vulcanizable rubber compositions thereto. A considerable increase in bond of rubber to the esterified fibers is thus obtained on vulcanization.

The fibrous materials used according to the present invention include fibrous materials capable of esterification. The invention is of special advantage in connection with tire fabrics and cords of cotton and rayon. The fibers may thus be natural fibers such as cotton and linen or artificial fibers such as viscose rayon or cuprammonium rayon, or the fibrous material may be partially esterified or etherified with other groups so long as it still contains uncombined hydroxyl groups capable of esterification.

The esterification of the fibrous material may be carried to a greater or less extent but is advantageously partially confined as far as possible to the fiber surfaces. The esterification of the cellulose can be carried out by various methods of esterification and with regulation of the degree of esterification and depth to which the esterification continues into the body of the fiber.

The acids, etc., used for the esterification are aliphatic or non-aromatic acids or their anhydrides, etc. The acids, anhydrides, etc., which have been found to bring about this increase in the adhesion of rubber to esterifiable fibers such as cellulose fibers, are those containing the alpha-beta or conjugated unsaturated acrylyl or substituted acrylyl group

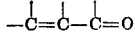

and includes such compounds as acrylic, crotonic, maleic, fumaric, itaconic, and citraconic acids, and their halides and anhydrides.

In carrying out the process of the invention, the fibrous material is subjected to esterification and the vulcanizable rubber composition is applied thereto and the composite rubber-fabric product subjected to vulcanization.

The invention includes the improved process and the final vulcanized product. The final composite product, made from the esterified fibrous material and with the application of vulcanizable rubber compositions thereto followed by vulcanization, is an improved product characterized by improved adhesion between the vulcanized rubber and fibrous material.

The advantages of the invention are illustrated by a comparison of final vulcanized products made according to the present invention with products similarly produced from unesterified fibrous materials.

The improved products of the present invention show greatly increased bonding strength between the rubber and fibrous materials, e. g., when tested by the testing methods hereinafter referred to.

The rubber compositions which are bonded to the fabric will vary with the character of products produced. Such rubber compositions are well known in the art and are illustrated for example by so-called squeegee stocks and tire carcass stocks in which the rubber is compounded with the vulcanizing agents, accelerators, plasticizers, pigments, etc., with the particular formula varying somewhat with different tires and other products. The rubber compositions may be of natural rubber or of synthetic rubbers such as Buna rubbers, Neoprene, etc., and those "elastomers" which still contain ethylenic double bonds after completion of polymerization.

While peroxide catalysts can be used in the process, such as benzoyl peroxide, better results have been found in most cases where such catalysts are omitted.

The invention will be further illustrated by the following examples:

*Example 1.*—Cotton and spun rayon duck were separately treated according to the following procedure: The duck was dried overnight in a vacuum desiccator containing anhydrous calcium chloride and the dried duck transferred to a receptacle containing a large excess of a 20% solution of maleic anhydride in anhydrous pyridine. This reaction mixture was maintained at 60–65° C. for 1 hour with occasional agitation. The excess liquid was then drawn off and the duck was washed with several changes of very dilute hydrochloric acid. It was then washed successively with very dilute ammonium hydroxide and then with water until neutral. The samples of duck were air-dried with untreated blanks which had been given the same washing treatment. The process thus described results in esterification of the fibers of the duck, limited largely to surface esterification.

For test purposes, a compounded vulcanizable rubber stock was applied to the esterified fabrics and to the untreated fabrics and the composite products cured under optimum conditions for the rubber stock used. On subjecting the different products to testing by the methods hereinafter described, materially increased average overlap and tear bond strength was obtained with the products made from the esterified fabrics as compared with the products made from the unesterified fabrics and higher percentage increases were obtained with the esterified rayon duck than with the esterified cotton duck.

*Example 2.*—The procedure was the same as in Example 1 except that the esterified duck was immersed in an 0.5% solution of benzoyl peroxide in toluene and air-dried before the preparation of the test specimens. A very material increase in the average overlap and tear bond was obtained with the esterified cotton duck and a considerably greater percentage increase with the esterified rayon duck.

*Example 3.*—Both rayon and cotton duck were treated by drying under vacuum in an apparatus containing anhydrous calcium chloride and placed in an excess of the following mixture, the parts being by weight:

| | Parts |
|---|---|
| Crotonic acid | 600 |
| Chloracetic anhydride | 1200 |
| Magnesium perchlorate | 2 |

The reaction mixture was maintained at approximately 70° C. for 20 minutes to effect partial esterification. The excess liquid was drawn off and the duck washed thoroughly with water, dilute ammonium hydroxide, and finally with water. After drying, test specimens were prepared by applying a vulcanizable rubber stock and curing under optimum conditions and unesterified duck was similarly treated. On testing the resulting products, it was found that much greater adhesion of the rubber to the fabric was obtained with the esterified fabrics and a considerably greater percentage increase with the esterified rayon than with the esterified cotton.

*Example 4.*—The procedure was the same as that of Example 3 except that the esterified duck was given the after-treatment with 0.5% benzoyl peroxide described in Example 2. Considerably increased overlap and tear bond strengths were obtained with the products made from esterified fabrics and a greater percentage increase with the rayon fabric than with the cotton fabric.

*Example 5.*—Rayon duck was immersed in a large excess of the following mixture, the parts being by weight:

| | Parts |
|---|---|
| Maleic anhydride | 10 |
| Acetic anhydride | 7 |
| Pyridine | 50 |

The duck was allowed to remain for 1 hour without external heating, and, after washing and drying, test specimens were prepared as in the previous examples and it was found that the average bond strength was materially greater in the product made from the esterified rayon duck than from the untreated rayon duck.

In the case of regenerated cellulose fibers capable of esterification, such as rayon, etc., the unsaturated compounds may be incorporated therein at the time of manufacture under conditions such that esterification will take place, thus giving directly regenerated cellulose fibers having an improved affinity for rubber.

It will be understood that variations and modifications can be made in the invention and that the invention is not limited to the specific illustrative examples given.

I claim:

1. The method of improving the adhesion of rubber to cellulosic fibrous material containing esterifiable hydroxyl groups which comprises reacting with said material an aliphatic alpha-beta unsaturated compound selected from the group consisting of alpha-beta unsaturated carboxylic acids and their anhydrides and halides, applying a vulcanizable rubber compound to the esterified fibrous material and vulcanizing the rubber compound.

2. The method of improving the adhesion of rubber to cellulosic fibrous material containing esterifiable hydroxyl groups which comprises reacting with said material an aliphatic alpha-beta unsaturated compound selected from the group consisting of maleic anhydride and crotonic acid, applying a vulcanizable rubber compound to the esterified fibrous material and vulcanizing the rubber compound.

3. The method of improving the adhesion of rubber to cellulosic fibrous material containing esterifiable hydroxyl groups which comprises reacting maleic anhydride with said material, applying a vulcanizable rubber compound to the esterified fibrous material and vulcanizing the rubber compound.

4. The method of improving the adhesion of rubber to cellulosic fibrous material containing esterifiable hydroxyl groups which comprises reacting crotonic acid with said material, applying a vulcanizable rubber compound to the esterified fibrous material and vulcanizing the rubber compound.

5. The method of improving the adhesion of rubber to cellulosic fibrous material containing esterifiable hydroxyl groups which comprises applying a vulcanizable rubber compound to cellulosic fibrous material, esterified with an aliphatic alpha-beta unsaturated compound selected from the group consisting of alpha-beta unsaturated carboxylic acids and their anhydrides and halides, and vulcanizing the rubber compound.

6. A composite vulcanized rubber product including cellulosic fibrous material containing esterifiable hydroxyl groups esterified with an aliphatic alpha-beta unsaturated compound selected from the group consisting of alpha-beta unsaturated carboxylic acids and their anhydrides and halides, said esterified fibrous material being bonded to vulcanized rubber and said vulcanized product being characterized by improved adhesion between the fibrous material and vulcanized rubber.

FRED S. PERKERSON.

REFERENCES CITED

The following references are of record in the file of this patent:

UNITED STATES PATENTS

| Number | Name | Date |
|---|---|---|
| 1,800,860 | Clarke et al. | Apr. 4, 1931 |
| 1,812,790 | Jaeck et al. | June 30, 1931 |
| 1,878,783 | Landolt | Sept. 20, 1932 |
| 1,880,808 | Clarke et al. | Oct. 4, 1932 |
| 2,225,589 | Haussmann et al. | Dec. 17, 1940 |
| 2,302,082 | Whitehead | Nov. 17, 1942 |
| 2,380,184 | Marple | July 10, 1945 |
| 2,390,032 | Stallings | Nov. 27, 1945 |
| 2,418,633 | Gould | Apr. 8, 1947 |
| 2,439,514 | Herndon | Apr. 13, 1948 |